(12) United States Patent
Leber et al.

(10) Patent No.: US 10,228,910 B2
(45) Date of Patent: *Mar. 12, 2019

(54) OVERFLOW DETECTION FOR SIGN-MAGNITUDE ADDERS

(71) Applicant: INTERNATIONAL BUSINESS MACHINES CORPORATION, Armonk, NY (US)

(72) Inventors: Petra Leber, Boeblingen (DE); Cedric Lichtenau, Boeblingen (DE); Silvia M. Mueller, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,812

(22) Filed: May 1, 2018

(65) Prior Publication Data
US 2018/0253282 A1 Sep. 6, 2018

Related U.S. Application Data

(63) Continuation of application No. 15/372,867, filed on Dec. 8, 2016.

(51) Int. Cl.
*G06F 7/499* (2006.01)
*G06F 7/505* (2006.01)

(52) U.S. Cl.
CPC ............ *G06F 7/4991* (2013.01); *G06F 7/505* (2013.01)

(58) Field of Classification Search
CPC .................................................. G06F 7/4991
USPC ................................................. 708/498, 552
See application file for complete search history.

(56) References Cited

U.S. PATENT DOCUMENTS

| 4,021,655 A | 5/1977 | Healey et al. |
| 4,366,548 A | 12/1982 | Kregness et al. |
| 4,379,338 A | 4/1983 | Nishitani et al. |
| 4,768,160 A | 8/1988 | Yokoyama |
| 4,817,047 A | 3/1989 | Nishitani et al. |
| 5,675,528 A | 10/1997 | Matula |
| 6,151,616 A | 11/2000 | Mahurin |
| 7,206,800 B1 | 4/2007 | Bentz |

(Continued)

FOREIGN PATENT DOCUMENTS

CN 1309347 A 8/2001

OTHER PUBLICATIONS

International Business Machines Corporation (IBM), "z/Architecture Principles of Operation," IBM® Publication No. SA22-7832-10, Eleventh Edition, Mar. 2015, pp. 1-1732.

(Continued)

*Primary Examiner* — Tan V Mai
(74) *Attorney, Agent, or Firm* — William Kinnaman, Esq.; Kevin P. Radigan, Esq.; Heslin Rothenberg Farley & Mesiti P.C.

(57) ABSTRACT

A circuit is provided which includes arithmetic computation logic configured to add or subtract operands of variable length to produce a result in a sign-magnitude data format. The circuit also includes an overflow detector to provide an overflow signal indicative of whether the result fits within a specified result length l. The overflow detector operates on the operands prior to the arithmetic computation logic producing the result to determine, independent of the result produced by the arithmetic computation logic, whether the result fits within the specified result length l.

18 Claims, 6 Drawing Sheets

(56) References Cited

U.S. PATENT DOCUMENTS

| | | |
|---|---|---|
| 9,665,347 B2 | 5/2017 | Lutz et al. |
| 2002/0038202 A1 | 3/2002 | Ferroussat et al. |
| 2009/0049417 A1 | 2/2009 | Kinoshita et al. |
| 2011/0320514 A1 | 12/2011 | Carlough et al. |

OTHER PUBLICATIONS

International Business Machines Corporation (IBM), "Power ISA™ Version 2.07B," International Business Machines Corporation, Apr. 9, 2015, pp. 1-1527.

Leber et al., "Overflow Detection for Sign-Magnitude Adders", U.S. Appl. No. 15/372,867, filed Dec. 8, 2016 (33 pages).

Leber et al., "List of IBM Patents and Patent Applications Treated as Related", U.S. Appl. No. 15/967,812, filed May 1, 2018, dated May 1, 2018 (2 pages).

FROM FIG. 5A

THE OPERANDS INCLUDE AN OPERAND A AND AN OPERAND B, AND THE ARITHMETIC COMPUTATION LOGIC IS CONFIGURED TO ADD THE OPERANDS OF VARIABLE LENGTH, AND THE OVERFLOW DETECTOR IMPLEMENTS A SEPARATE CARRY-TREE FOR OPERAND A AND OPERAND B USING THE FOLLOWING EQUATIONS FOR A DIGIT GENERATE (G-TERM) SIGNAL AND A DIGIT PROPAGATE (P-TERM) SIGNAL, INCLUDING 9-PADDING, AND DERIVES A CARRY-OUT FROM THE G-TERM AND P-TERM, THE OVERFLOW SIGNAL BEING BASED ON THE CARRY-OUT: ~530

M(n-1, ... , 0) IS A BIT VECTOR, WITH M(k) = 0 IF k < l, AND M(k) = 1 IF K >= l, WHEREIN:

G-TERM FOR DIGIT k: A(k) + B(k) + 9* M(k) >= 10, WHERE THE DIGITS A(k) AND B(k) AND A POTENTIAL 9-PADDING GENERATES A CARRY; AND

P-TERM FOR DIGIT k: A(K) + B(k) + 9* M(k) >= 9, THE DIGIT k PROPAGATES A CARRY

THE OPERANDS INCLUDE AN OPERAND $A$ AND AN OPERAND $B$, AND THE ARITHMETIC COMPUTATION LOGIC IS CONFIGURED TO SUBTRACT THE OPERANDS OF VARIABLE LENGTH, AND THE OVERFLOW DETECTOR IMPLEMENTS A SEPARATE CARRY-TREE FOR OPERAND $A$ AND OPERAND $B$ USING THE FOLLOWING EQUATIONS FOR A DIGIT GENERATE (G-TERM) SIGNAL AND A DIGIT PROPAGATE (P-TERM) SIGNAL, INCLUDING USING PADDING OF $10^l$, WHERE $l$ IS THE SPECIFIED RESULT LENGTH $l$: ~535

M(n-1, ... , 0) IS A BIT VECTOR, WITH M(k) = 0 IF k !=l AND M(k) =1 IF k=l:

FOR $A > B$ $(A-B)$:

G-TERM FOR DIGIT k: !A(k) + B(k) + 1* M(k) >= 16 (THE DIGITS A(k) AND B(k) AND A POTENTIAL 1-PADDING GENERATES A CARRY),

P-TERM FOR DIGIT k: !A(k) + B(k) + 1* M(k) >= 15 (THE DIGIT k PROPAGATES A CARRY); AND

FOR $B >= A$ $(B-A)$:

G-TERM FOR DIGIT k: A(k) + !B(k) + 1* M(k) >= 16 (THE DIGITS A(k) AND B(k) AND A POTENTIAL 1-PADDING GENERATES A CARRY),

P-TERM FOR DIGIT k: A(k) + !B(k) + 1* M(k) >= 15 (THE DIGIT k PROPAGATES A CARRY)

THE OPERANDS MAY BE IN BINARY-CODED DECIMAL FORMAT, AND THE ARITHMETIC COMPUTATION LOGIC INCLUDES A SIGN-MAGNITUDE ADDER ~540

FIG. 5B

OVERFLOW DETECTION FOR SIGN-MAGNITUDE ADDERS

BACKGROUND

Fixed point, binary-coded decimal (BCD) data format is a widely used format in commercial applications, such as in business, finance, and administrative systems for companies and governments. For instance, financial applications handling financial data often employ this format, such as many banking applications and homegrown banking codes. The common programming language used by these applications or codes is often COBOL or PL/1. This particular data format is also the default data type for certain databases, such as DB2™, offered by International Business Machines Corporation of Armonk, N.Y., and an SAP server, offered by SAP SE of Walldorf, Germany.

When performing certain types of arithmetic operations on binary-coded decimal data, it is necessary to know whether the result of the operation is within a target data width for the result. For instance, this is a widely used feature in COBOL codes, where inputs and results may have different widths, and the application expects COBOL to check for validity of the operation. One approach to checking for validity is to generate the result, and then apply a mask to the result to identify potential overflow digits, and check whether any of the digits is non-zero in the overflow.

SUMMARY

The shortcomings of the prior art are overcome and additional advantages are provided, in one or more aspects, through the provision of a circuit which includes arithmetic computation logic and an overflow detector. The arithmetic computation logic is configured to add or subtract operands of variable length to produce a result in a sign-magnitude data format. The overflow detector provides an overflow signal indicative of whether the result fits within a specified result length l. The overflow detector operates on the operands prior to the arithmetic computation logic producing the result to determine, independent of the result produced by the arithmetic computation logic, whether the result fits within the specified result length l.

In one or more other aspects, a method is provided which includes providing a circuit to perform an arithmetic operation. The providing includes providing arithmetic computation logic configured to add or subtract operands of variable length to produce a result in a sign-magnitude data format. Additionally, the providing includes providing an overflow detector to produce an overflow signal indicative of whether the result fits within a specified result length l. The overflow detector operates on the operands prior to the arithmetic computation logic producing the result to determine, independent of the result produced by the arithmetic computation logic, whether the result fits within the result length l.

In one or more further aspects, a computer program product is provided for detecting overflow of an add or subtract operation. The computer program product includes a computer readable storage medium having program instructions embodied therewith. The program instructions are executable by a processor to perform a method including: arithmetically adding or subtracting operands of variable lengths to produce a result in a sign-magnitude data format; and producing an overflow signal indicative of whether the result fits within a specified result length l. Producing the overflow signal includes operating on the operands prior to the arithmetic adding or subtracting producing the result to determine, independent of the result produced by the arithmetic adding or subtracting, whether the result fits within the specified result length l.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A & 5B depict one embodiment of a process for performing an arithmetic add or subtract operation with overflow detection, in accordance with one or more aspects of the present invention.

DETAILED DESCRIPTION

The description that follows includes exemplary devices, systems, methods, techniques and instruction sequences that embody techniques of the present invention. However, it should be understood that the described invention may be practiced, in one or more aspects, without these specific details. In other instances, well-known protocols, structures and techniques have not been shown in detail in order not to obscure the invention. Those of ordinary skill in the art will appreciate that the described techniques and mechanisms may be applied to various architectures which order values.

As briefly noted above, fixed-point decimal data format (BCD) is widely used in commercial applications, such as commercial applications in the financial industry, including banking, accounting, etc. Common programming languages for these applications include COBOL, PL/1, Java, C++. In addition, the format is used as a default data type for certain databases, such as the above-noted DB2™ database and SAP™ server. With these applications, the data may be of a variable data width in multiple bytes, for instance, +123, −00123. Because of this, a specified result length 1 is typically provided for the arithmetic operation. The most common data width for databases today is 9 bytes.

In performing an arithmetic operation on binary-coded decimal (BCD), or more generally, sign-magnitude data, it is important to know whether the result fits within the target data width. Otherwise, most significant digits may be lost. As noted, this is a widely used feature in certain applications, such as COBOL codes. In these applications, the inputs, or operands, and the results can have different widths. Many existing applications expect a check for the validity of the operation.

Figure 1:
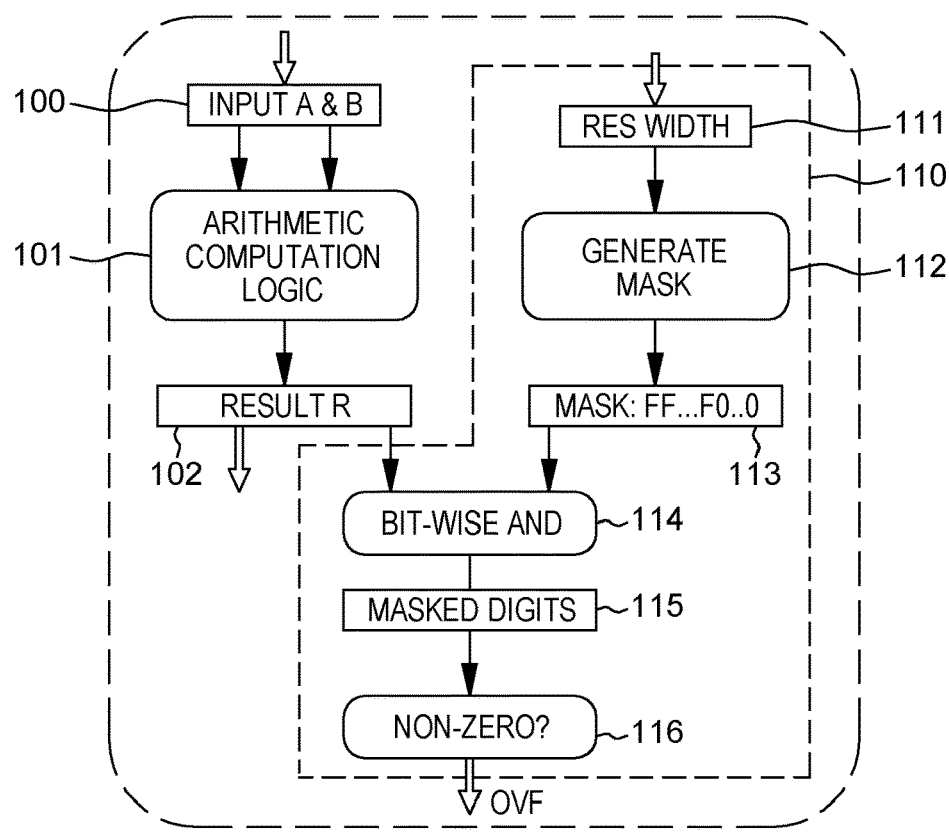
FIG. 1 is a schematic of one embodiment of a circuit, or device, which includes arithmetic computation logic and an overflow detector for checking for overflow of a result produced by the arithmetic computation logic.

FIG. 1 depicts one state of the art embodiment of a circuit to perform an arithmetic operation with an associated overflow check. As illustrated, operands A and B 100 are fed to an arithmetic computation logic or circuit 101, such as a sign-magnitude adder, to undergo an add or subtract operation, with the arithmetic computation logic 101 producing a result R 102. An overflow detector 110 is provided which receives as input a specified result length 1 111 and generates 112 a mask 113, which is then bit-wise ANDed 114 to identify masked digits 115, and determine whether the masked digits 115 are non-zero 116 indicative of an overflow (OVF).

Note that with the approach of FIG. 1, the result R is first generated, and then a mask is applied to the result to identify the potentially overflowing digits, and a check is made whether any of these digits is non-zero. With this approach, note also that the overflow detection occurs after the actual calculation, and therefore necessarily adds to the latency of the full operation. This does not only slow up execution, but also reduces the window for speculative branch prediction and/or execution, which has a high performance cost as the overflow result used by a branch takes longer to compute. A miss-predicted branch costs, for instance, at least 25 core cycles. Note in this regard that an overflow signal often is used to set return code of procedures, such as if-then-else code.

Generally stated, disclosed herein are fast and efficient approaches to detecting whether a result of an arithmetic operation on data, such as binary-coded decimal data, is within a specified result length 1.

In one or more implementations, overflow detection occurs, in accordance with one or more aspects of the present invention, in parallel with performing the actual arithmetic operation or computation by using special checking hardware that operates on the operands, and not on the result of the operation. As described herein, the overflow can be computed even before the final result of the arithmetic operation is obtained. This advantageously shortens the overall latency of the operation. Further, in view this disclosure, the overflow detector may be implemented by one of ordinary skill in the art, with only limited additional hardware.

Figure 2:
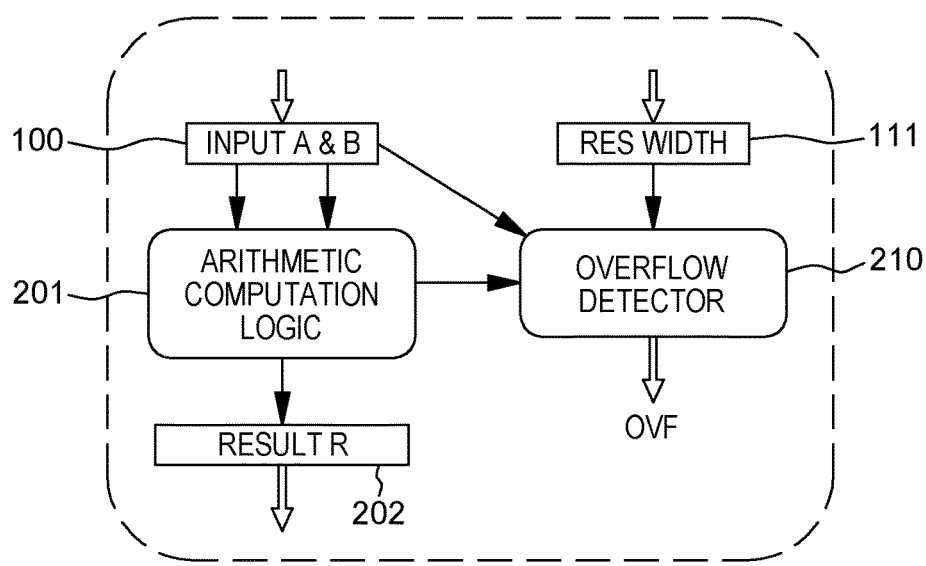
FIG. 2 is a schematic of one embodiment of a circuit, or device, which includes arithmetic computation logic and an overflow detector, in accordance with one or more aspects of the present invention.

FIG. 2 depicts one example of a circuit or device with overflow detection, in accordance with one or more aspects of the present invention. In this implementation, operands A and B 100 are received at an arithmetic computation logic 201, such as a sign-magnitude adder configured to perform an arithmetic add or subtract operation on the operands. Additionally, an overflow detector 210 is provided which also receives operands A and B 100, as well as a specified result length 1 111. Additionally, in one or more embodiments, overflow detector 210 is provided with a length specifier for operands A and B, for instance, from arithmetic computation logic 201. As illustrated, the overflow detector 210 produces an overflow signal (OVF) in parallel with the result R 202 produced by the arithmetic computation logic. In particular, in one or more embodiments, overflow detector 210 operates on the operands 100 in parallel with the arithmetic computation logic 201. Further, the overflow detector 210 may provide the overflow signal OVF prior to or in parallel with the arithmetic computation logic 201 producing the result R in a sign-magnitude data format.

Various embodiments implementing overflow detection in accordance with one or more aspects of the present invention are described further below with reference to FIGS. 3A-5B. Note that the overflow detection facility disclosed herein may be used for binary sign-magnitude adders, as well as decimal sign-magnitude adders. By way of illustration, the decimal version is described since it has higher complexity, and the binary version is straightforward to one of ordinary skill in the art based upon the description provided herein.

As explained further below, an arithmetic engine is provided configured to operate on variable-length operands in a sign-magnitude data format. The arithmetic engine, unit, circuit, logic, etc., is adapted to: receive length specifiers for the operands, as well as the result, to receive operands obeying the length specification, to compute the result in a sign-magnitude format as the sum or difference of the operands, and to provide an overflow signal to indicate whether the result fits within the requested length. The overflow check is performed independent of the result produced by the arithmetic operation, and in parallel to the actual arithmetic computation.

As explained further below, the overflow check or detect may include using a padding vector that is generated based on the length specifier of the result. The overflow signal includes or may be detected as the carry-out of a 3-way sum or difference of the padding vector and the two operands. In one or more embodiments, the data may be in any BCD format, and the carry-out detect of the overflow check may be performed using a modified digit generate and propagate logic, which incorporates the padding for a given digit, and then uses a regular carry-tree to derive the carry-out signal from the modified digit generate and digit propagate signal, as will be apparent to those skilled in the art from the description provided herein.

There are two cases which have to be examined: effective add and effective subtract.

Figure 3A:
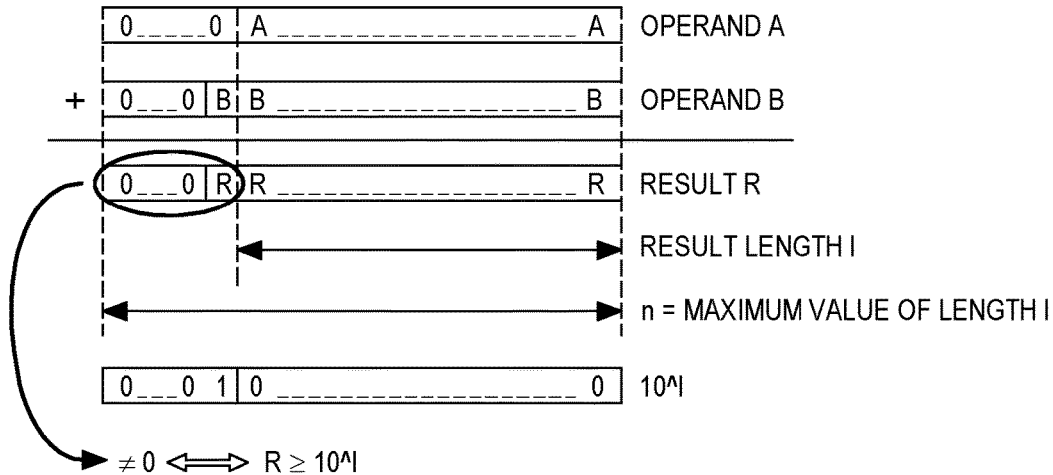
FIG. 3A is an example of two operands provided to an arithmetic computation logic and a result obtained where the result is larger than a specified result length l, and which is to be identified in accordance with one or more aspects of the present invention.

1. Effective Add Case:

FIG. 3A depicts the addition of operand A and operand B. If the result R is greater than the specified result length 1, an overflow occurs. Note that $10^l$ is a bit string with a 1 followed by 1 trailing zeros. In the equation (1) below, it indicates the value of the given bit string. The following equation (1) shows the determination of the overflow based on the maximum length n of the operands and truncated result, as well as the desired result length 1:

$$OVF = 1 \iff A + B >= 10\char`^ l \quad (1)$$
$$\iff A + B + (10\char`^ n - 10\char`^ l) >= 10\char`^ n$$

As noted, a conventional implementation would generate the sum of the two operands, and then check whether the result has a length of more than l.

Figure 3B:
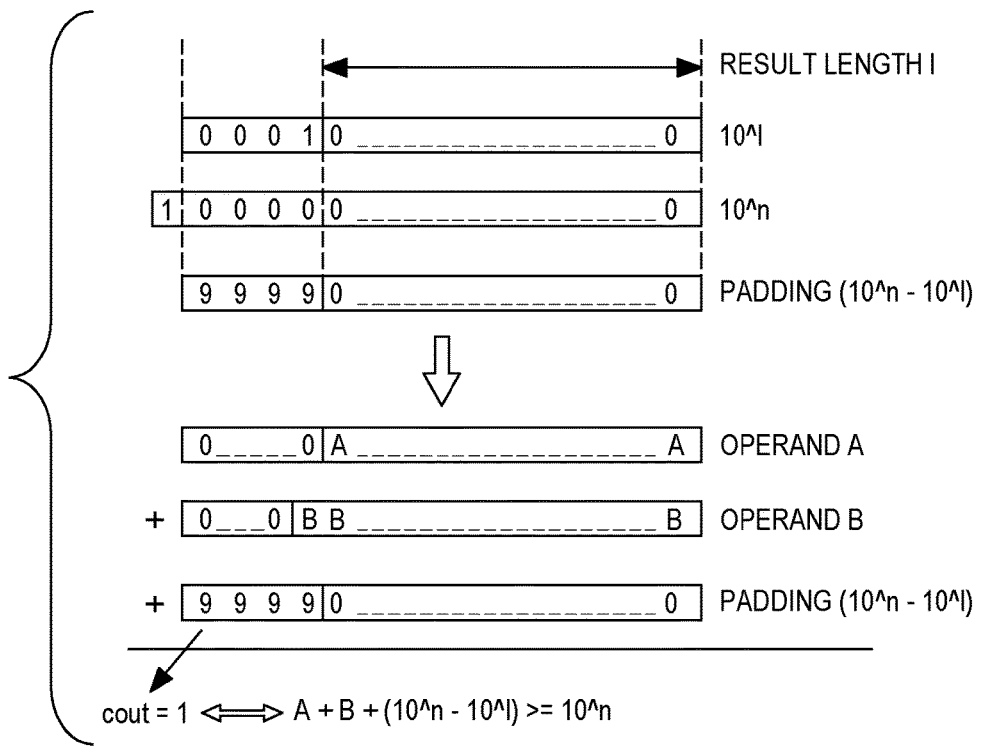
FIG. 3B depicts an example of an overflow detect process for an overflow detector, which is associated with an arithmetic computational logic configured to perform an add operation, in accordance with one or more aspects of the present invention.

With this disclosure, the overflow detection can be reduced to checking only the carry-out of the complete n-digit adder. This can be done with padding the bits left of the result length l. A carry-out left of the result length will then be propagated to the left-most position and generate a carry-out. One embodiment of this is depicted in FIG. 3B.

An implementation of this approach would be the following. By adding the two operands and the padding vector in a conventional manner, a 3:2 addition is done and after that the resulting sum and carry vector are added to get the result and the overflow.

Another implementation of the overflow detection disclosed herein would be a separate carry-tree for A and B using a modified equation for the digit generate and propagate signals, including the 9-padding. The equations employed would be as follows:

Let $M(n-1, \ldots, 0)$ be a bit vector, with $M(k)=0$ if $k<l$ and $M(k)=1$ if $k>=l$ $$\text{g-term for digit k: } A(k)+B(k)+9*M(k)>=10 \quad (2)$$

(the digits A(k) and B(k) and a potential 9-padding generates a carry)

$$\text{p-term for digit k: } A(k)+B(k)+9*M(k)>=9 \quad (3)$$

(the digit k propagates a carry).

Figure 4A:
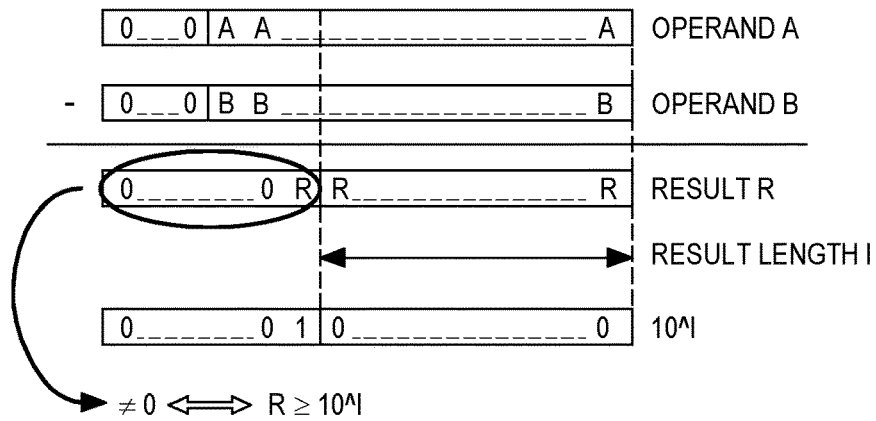
FIG. 4A is an example of two operands and a result with an overflow to be detected by an overflow detector, which is associated with an arithmetic computation logic configured to perform a subtract operation, in accordance with one or more aspects of the present invention.

2. Effective Subtract Case:

Since it is necessary to compute the absolute difference, two cases need to be distinguished, computing A−B or B−A. abs(A−B)=>Case 1: A−B for A>B
Case 2: B−A for B>=A FIG. 4A depicts the subtraction of operand A and operand B. If the result R is greater than the specified result length l, an overflow result occurs. Note with reference to FIG. 4A:

$$OVF = 1 \iff R = A-B >= 10\char`^ l$$
$$\iff A >= B + 10\char`^ l$$

It is well known that a carry-out cout (X+!Y)=1 indicates Y<X and cout (X +!Y)=0 indicates that Y>=X For case 1 (A>B<=>A−B), with A=Y and (B+10 ^l)=X a carry-out cout(X+!Y), the OVF detection can be expressed as:

$$cout(X + !Y) = 0 \iff Y >= X$$
$$\iff A >= B + 10\char`^ l$$
$$\iff A - B >= 10\char`^ l$$
$$\iff R >= 10\char`^ l$$
$$\iff OVF = 1$$

As shown above, an overflow is obtained if there is not a carry-out of the calculation.

For case 2 (B>=A<=>B−A), there is the same assumption as for case 1:

$$R\ 22 = 10\char`^ l => OVF=1$$

So the following equation may be obtained:

$$R<=>(B - A) \iff B - A >= 10\char`^ l$$
$$\iff B >= A + 10\char`^ l.$$

Now with Y=B and X=(A+10^l), the following is obtained:

$$cout(X + !Y) = 0 \iff Y >= X$$
$$\iff B >= A + 10\char`^ l$$
$$\iff B - A >= 10\char`^ l$$
$$\iff R >= 10\char`^ l$$
$$\iff OVF = 1$$

So an overflow (and hence R>10^l) can be detected for the effective subtract case with the following two equations:

$$A>B \text{ case } 1\ (A-B): cout(B+!A+10\char`^ l)=0<=>OVF=1$$

$$B>A \text{ case } 2\ (B-A): cout(A+!B+10\char`^ l)=0<=>OVF=1$$

Figure 4B:
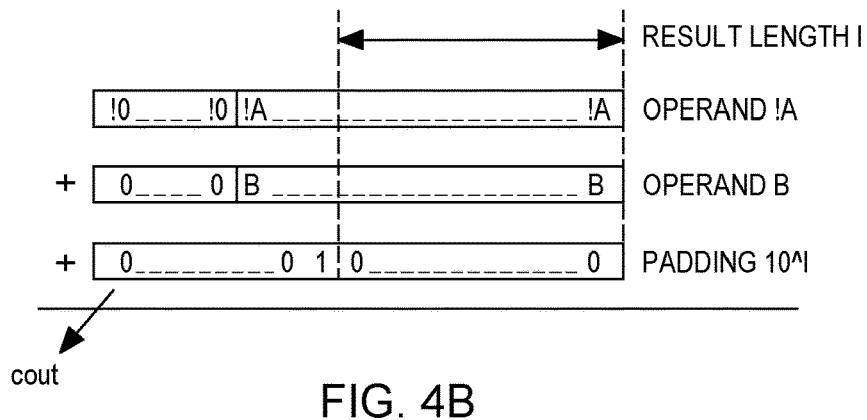
FIG. 4B depicts an overflow detection process example for an overflow detector associated with arithmetic computation logic performing a subtraction operation where operand A is larger than operand B, in accordance with one or more aspects of the present invention.
Figure 4C:
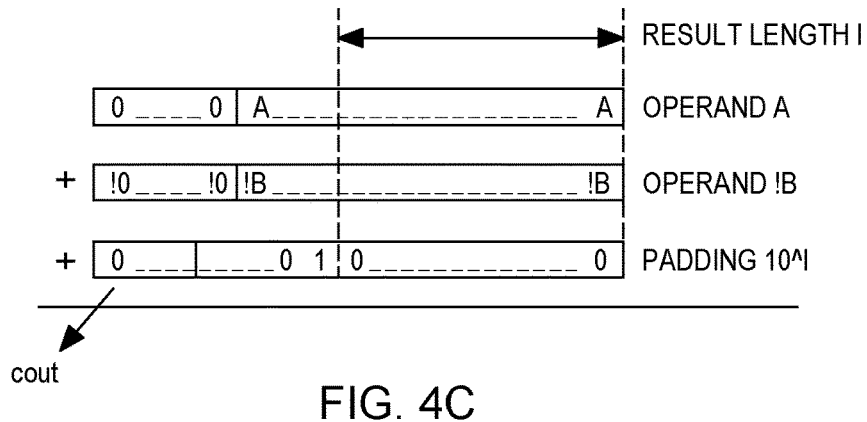
FIG. 4C depicts an overflow detection process example for an overflow detector associated with arithmetic computation logic performing a subtraction operation where operand B is larger than operand A, in accordance with one or more aspects of the present invention.

Examples of these two cases are respectively shown in FIGS. 4B & 4C. Similar to the effective addition case, the above equations lend themselves to a fast OVF detection, using two separate, specialized carry-trees. These two carry-trees use the following modified equations for the digit generate and propagate signals, including the 10^l padding: Let $M(n-1, \ldots, 0)$ be a bit vector, with $M(k)=0$ if $k!=l$ and $M(k)=1$ if $k=l$ For case 1 (A−B):

$$\text{g-term for digit k: } !A(k)+B(k)+1*M(k)>=16 \quad (4)$$

(The digits A(k) and B(k) and a potential 1-padding generates a carry.)

$$\text{p-term for digit k: } !A(k)+B(k)+1*M(k)>=15 \quad (5)$$

(The digit k propagates a carry.)

For case 2 (B−A):

$$\text{g-term for digit k: } A(k)+!B(k)+1*M(k)>=16 \quad (6)$$

(The digits A(k) and B(k) and a potential 1-padding generates a carry.)

$$\text{p-term for digit k: } A(k)+!B(k)+1*M(k)>=15 \quad (7)$$

(This digit k propagates a carry.) Note that the above two-carry-tree discussion is provided by way of example only. If desired, a single carry-tree using end-around carry may be employed in an alternate embodiment.

Figure 5A:
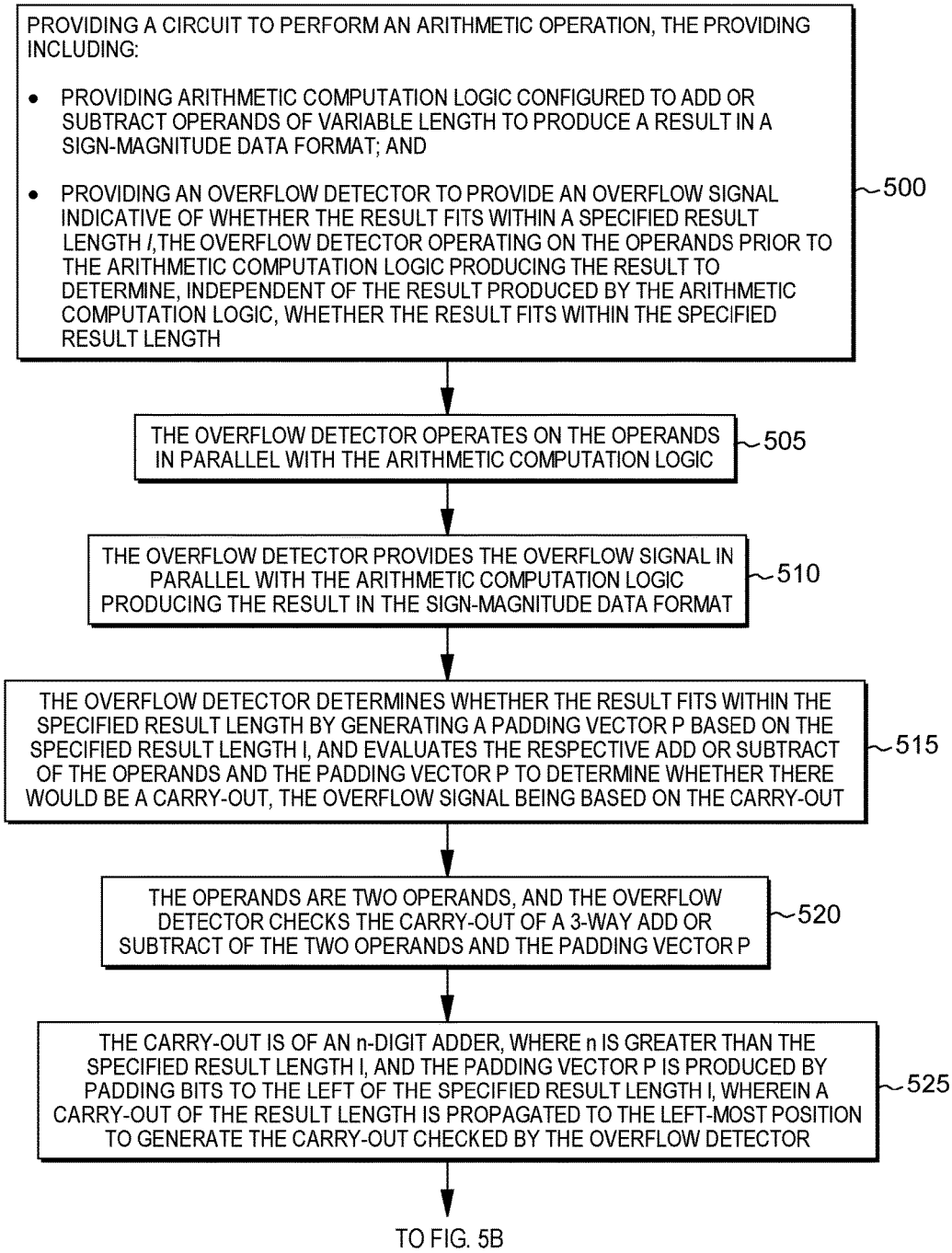

FIGS. 5A &5B depict one embodiment of an overview of various processes, in accordance with one or more aspects of present invention. As depicted with FIGS. 5A & 5B, a method of providing a circuit to perform an arithmetic operation is disclosed 500. Providing the circuit may include: providing arithmetic computation logic configured to add or subtract operands of various lengths to produce a result in a sign-magnitude format; and providing an overflow detector to provide an overflow signal indicative of wither the result fits within the specified result length l, the overflow detector operating on the operands prior to the arithmetic computation logic producing the result to determine, independent of the result produce by the arithmetic computation logic, whether the result fits within the specified result length.

In one or more implantations, the overflow detector operates on the operands in parallel with the arithmetic computation logic 505. Further, the overflow detector may provide the overflow signal prior to or in parallel with the arithmetic computation logic producing the result in the sign-magnitude data format 510.

In one or more embodiments, the overflow detector determines whether the result fits within the specified result length by generating a padding vector P based on the specified result length l, and evaluates the respective add or subtract of the operands and the padding vector P to determine wither there would be a carry-out, the overflow signal being based on the carry-out 515. For instance, the operands may be two operands, and the overflow detector checks the carry-out of a three-way add or subtract of the two operands and the padding vector P 520. In one or more embodiments, the carry-out is of an n-digit adder, where an n is greater than the specified result length l, and the padding vector P is produced by padding bits to the left of the specified result length l, wherein a carry-out of the result length is propagated to the left-most positon to generate the carry-out checked by the overflow detector 525.

In one or more embodiments, the operands may include an operand A and operand B, and the arithmetic computation logic is configured to add the operands of variable length, and the overflow detector implements a separate carry-tree for operand A and operand B using the following equations for a digit generate (g-term) signal and a digit propagate (p-term) signal, including 9-padding, and derives a carry-out from the g-term and p-term, the overflow signal being based on the carry-out: $M(n-1, \ldots, 0)$ is a bit vector, with $M(k)=0$ if $k<l$, and $M(k)=1$ if $k>=l$, wherein: g-term for digit k: $A(k)+B(k)+9^* M(k)>=10$, where the digits $A(k)$ and $B(k)$ and a potential 9-padding generates a carry; and p-term for digit k: $A(k)+B(k)+9^* M(k)>=9$, the digit k propagates a carry 530.

In one or more further embodiments, operands include an operand A and an operand B, and the arithmetic computation logic is configured to subtract the operands of variable length, and the overflow detector implements a separate carry-tree for operand A and operand B using the following equations for a digit generate (g-term) signal and a digit propagate (p-term) signal, including using padding of $10^l$, where l is the specified result length l: $M(n-1, \ldots, 0)$ be a bit vector, with $M(k)=0$ if $k!=l$ and $M(k)=1$ if $k=l$: for $A>B$ (A−B): g-term for digit k: $!A(k)+B(k)+1^* M(k)>=16$ (the digits $A(k)$ and $B(k)$ and a potential 1-padding generates a carry), p-term for digit k: $!A(k)+B(k)+1^* M(k)>=15$ (the digit k propagates a carry); and for $B>=A$ (B−A): g-term for digit k: $A(k) +!B(k)+1^* M(k)>=16$ (the digits $A(k)$ and $B(k)$ and a potential 1-padding generates a carry), p-term for digit k: $A(k)+!B(k)+1^* M(k)>=15$ (the digit k propagates a carry) 535.

In one or more embodiments, the operands may be in binary-coded decimal format, and the arithmetic computation logic may include a sign-magnitude adder 540.

Figure 6:
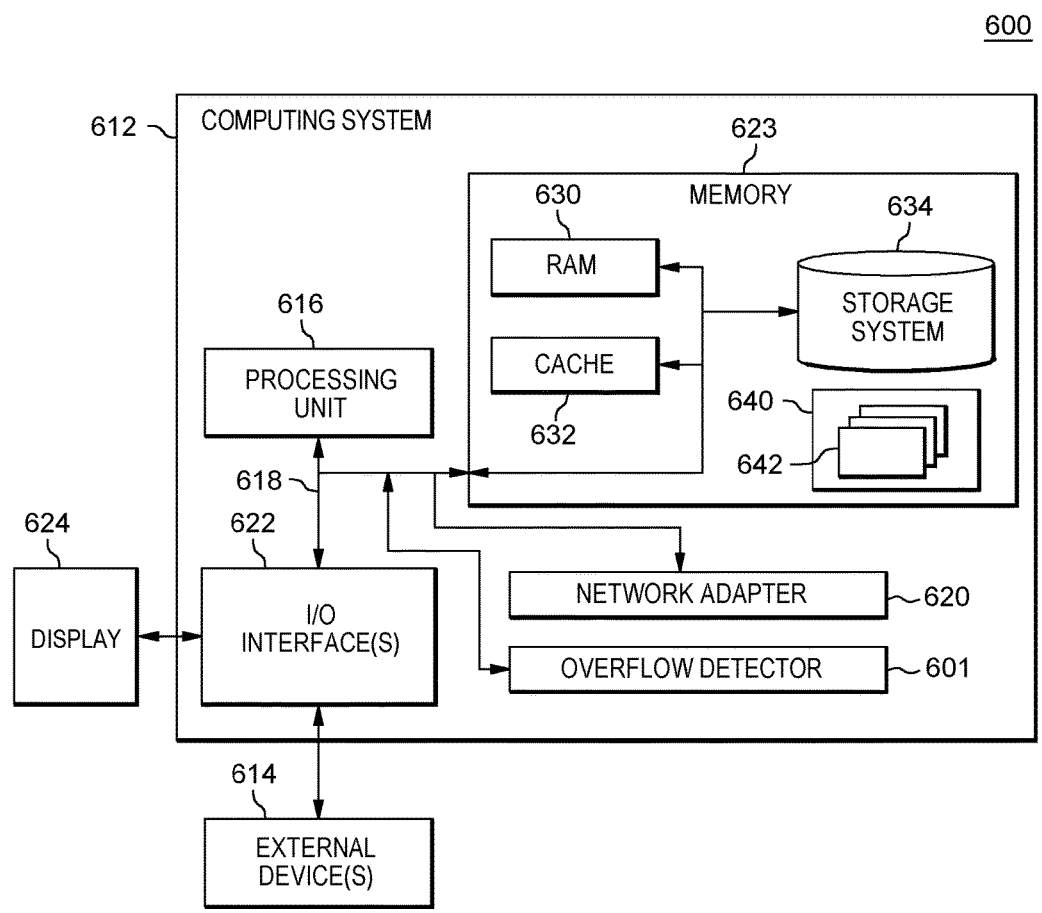
FIG. 6 is a block diagram of one embodiment of a data processing system which may implement one or more aspects of an arithmetic add or subtract operation and overflow detection, in accordance with one or more aspects of the present invention.

Referring to FIG. 6, a block diagram of a data processing system is shown in which illustrative aspects of the present invention may be implemented.

As shown, data processing system 600 includes a computing system 612. Examples of well-known computing systems, environments, and/or configurations that may be suitable for use with computer system 612 include, but are not limited to, a workstation, a computer, a server, and the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media could be provided. In such instances, each can be connected to bus 618 by one or more data media interfaces. As described below, memory 623 may include at least one program product having a set (e.g., at least one) of program modules that are configured to carry-out the functions of embodiments of the invention.

Program/utility 640, having a set (at least one) of program modules 642, may be stored in memory 632 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry-out the functions and/or methodologies of embodiments of the invention as described herein. Alternatively, a separate, overflow detection device, module, logic, etc., 601 (such as described herein) may be provided within computing environment 612.

Computing system 612 may also communicate with one or more external devices 614 such as a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

Those skilled in the art should note that the depicted system example of FIG. 6, as well as other examples referenced herein, are not meant to imply architectural limitations.

The present invention may be a system, a method, and/or a computer program product at any possible technical detail level of integration. The computer program product may include a computer readable storage medium (or media) having computer readable program instructions thereon for causing a processor to carry-out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry-out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A circuit comprising:
   arithmetic computation logic configured to add or subtract operands of variable length to produce a result in a sign-magnitude data format;
   an overflow detector to provide an overflow signal indicative of whether the result fits within a specified result length l, the overflow detector operating on the operands prior to the arithmetic computation logic producing the result to determine, independent of the result produced by the arithmetic computation logic, whether the result fits within the specified result length l; and
   wherein the overflow detector determines whether the result fits within the specified result length by generating a padding vector P based on the specified result length l, and evaluates the respective add or subtract of the operands and the padding vector P together to determine whether there would be a carry-out, the overflow signal being based on the carry-out.

2. The circuit of claim 1, wherein the overflow detector operates on the operands in parallel with the arithmetic computation logic.

3. The circuit of claim 1, wherein the overflow detector provides the overflow signal prior to the arithmetic computation logic producing the result in the sign-magnitude data format.

4. The circuit of claim 1, wherein the operands comprise two operands, and the overflow detector checks the carry-out of a 3-way add or subtract of the two operands and the padding vector P.

5. The circuit of claim 1, wherein the carry-out is of an n-digit adder, where n is greater than the specified result length l, and the padding vector P is produced by padding bits to the left of the specified result length l, wherein a carry-out of the result length is propagated to the left-most position to generate the carry-out checked by the overflow detector.

6. The circuit of claim 1, wherein the operands comprise an operand A and an operand B, and the arithmetic computation logic is configured to subtract the operands of variable length, and the overflow detector implements a separate carry-tree for operand A and operand B for a digit generate (g-term) signal and a digit propagate (p-term) signal, including using padding of $10^l$, where l is the specified result length l.

7. The circuit of claim 1, wherein the operands are in binary-coded decimal format, and the arithmetic computation logic comprises a sign-magnitude adder.

8. A method comprising:
   providing a circuit to perform an arithmetic operation, the providing comprising:
   providing arithmetic computation logic configured to add or subtract operands of variable length to produce a result in a sign-magnitude data format;
   providing an overflow detector to provide an overflow signal indicative of whether the result fits within a specified result length l, the overflow detector operating on the operands prior to the arithmetic computation logic producing the result to determine, independent of the result produced by the arithmetic computation logic, whether the result fits within the specified result length; and wherein the overflow detector determines whether the result fits within the specified result length by generating a padding vector P based on the specified result length l, and evaluates the respective add or subtract of the operands and the padding vector P together to determine whether there would be a carry-out, the overflow signal being based on the carry-out.

9. The method of claim 8, wherein the overflow detector operates on the operands in parallel with the arithmetic computation logic.

10. The method of claim 8, wherein the overflow detector provides the overflow signal prior to the arithmetic computation logic producing the result in the sign-magnitude data format.

11. The method of claim 8, wherein the operands comprise two operands, and the overflow detector checks the carry-out of a 3-way add or subtract of the two operands and the padding vector P.

12. The method of claim 8, wherein the carry-out is of an n-digit adder, where n is greater than the specified result length l, and the padding vector P is produced by padding bits to the left of the specified result length l, wherein a carry-out of the result length is propagated to the left-most position to generate the carry-out checked by the overflow detector.

13. The method of claim 8, wherein the operands comprise an operand A and an operand B, and the arithmetic computation logic is configured to subtract the operands of variable length, and the overflow detector implements a separate carry-tree for operand A and operand B for a digit generate (g-term) signal and a digit propagate (p-term) signal, including using padding of $10^l$, where l is the specified result length l.

14. The method of claim 8, wherein the operands are in binary-coded decimal format, and the arithmetic computation logic comprises a sign-magnitude adder.

15. A computer program product for detecting overflow of an add or subtract operation, the computer program product comprising:
a computer readable storage medium having program instructions embodied therewith, the program instructions being executable by a processor to perform a method comprising:
arithmetically adding or subtracting operands of variable length to produce a result in a sign-magnitude data format;
producing an overflow signal indicative of whether the result fits within a specified result length l, the producing operating on the operands prior to the arithmetic adding or subtracting producing the result to determine, independent of the result produced by the arithmetic adding or subtracting, whether the result fits within the specified result length l; and
wherein the overflow detector determines whether the result fits within the specified result length by generating a padding vector P based on the specified result length l, and evaluates the respective add or subtract of the operands and the padding vector P together to determine whether there would be a carry-out, the overflow signal being based on the carry-out.

16. The computer program product of claim 15, wherein the overflow detector provides the overflow signal prior to the arithmetic computation logic producing the result in the sign-magnitude data format.

17. The computer program product of claim 15, wherein the operands comprise an operand A and an operand B, and the arithmetic computation logic is configured to subtract the operands of variable length, and the overflow detector implements a separate carry-tree for operand A and operand B for a digit generate (g-term) signal and a digit propagate (p-term) signal, including using padding of $10^l$, where l is the specified result length l.

18. The computer program product of claim 15, wherein the operands are in binary-coded decimal format, and the arithmetic computation logic comprises a sign-magnitude adder.

* * * * *